United States Patent
Deitrich

(10) Patent No.: US 7,092,701 B2
(45) Date of Patent: Aug. 15, 2006

(54) METHODS, NETWORKS, AND COMPUTER PROGRAM PRODUCTS FOR SELECTIVELY ROUTING COMMUNICATIONS BASED ON ROUTING RULES

(75) Inventor: Thomas L. Deitrich, Chapel Hill, NC (US)

(73) Assignee: Sony Ericsson Mobile Communications, AB (SE)

( * ) Notice: Subject to any disclaimer, the term of this patent is extended or adjusted under 35 U.S.C. 154(b) by 216 days.

(21) Appl. No.: 10/722,198

(22) Filed: Nov. 26, 2003

(65) Prior Publication Data

US 2005/0113078 A1 May 26, 2005

(51) Int. Cl.
*H04M 3/42* (2006.01)
*H04Q 7/20* (2006.01)
(52) U.S. Cl. .................................. 455/417; 455/445
(58) Field of Classification Search ............... 455/417, 455/418, 445, 414.1
See application file for complete search history.

(56) References Cited

U.S. PATENT DOCUMENTS

| | | | |
|---|---|---|---|
| 5,325,419 A | 6/1994 | Connolly et al. | |
| 6,134,433 A * | 10/2000 | Joong et al. | 455/417 |
| 6,363,248 B1 * | 3/2002 | Silverman | 455/417 |
| 6,522,876 B1 | 2/2003 | Weiland et al. | |
| 2003/0013489 A1 * | 1/2003 | Mar et al. | 455/560 |
| 2005/0032509 A1 * | 2/2005 | Benco et al. | 455/417 |
| 2005/0096029 A1 * | 5/2005 | Pelaez et al. | 455/419 |

OTHER PUBLICATIONS

International search Report and the Written opinion of the International Searching Authority for application No. PCT/US2004/034381 mailed on Jun. 17, 2005.

* cited by examiner

*Primary Examiner*—Erika A. Gary
(74) *Attorney, Agent, or Firm*—Myers Bigel Sibley & Sajovec, PA

(57) ABSTRACT

A wireless terminal identifier and an alternate routing identifier are associated with a wireless terminal. When an incoming communication is directed to the wireless terminal identifier, it is routed based on the alternate routing identifier when the wireless terminal is not available.

27 Claims, 4 Drawing Sheets

| Wireless Phone Number | Alternate Phone Number | Alternate Email Address | Alternate Messaging Address |
|---|---|---|---|
| 123-456-7890 | 123-123-7890 | name1@yahoo.com | PhoneNo1@operator1.com |
| 123-456-7891 | 123-123-7891 | name2@msn.com | PhoneNo2@operator1.com |
| 123-456-7892 | 123-123-7892 | name3@lycos.com | PhoneNo3@operator2.com |
| 123-456-7893 | 123-123-7893 | name4@aol.com | PhoneNo4@operator2.com |

US 7,092,701 B2

METHODS, NETWORKS, AND COMPUTER PROGRAM PRODUCTS FOR SELECTIVELY ROUTING COMMUNICATIONS BASED ON ROUTING RULES

FIELD OF THE INVENTION

The present invention generally relates to communication systems, and more particularly to methods, networks, and systems for routing communications to wireless terminals.

BACKGROUND

There is a general trend for people to use an increasing number and variety of communication devices. For example, a person may now communicate by a subscriber line phone, wireless cellular phone, wireless pager, wireless data terminal, and email. The variety of communication devices can provide more flexibility for how, when, and where a person can be contacted, but it can also increase the complexity of such communication. For example, each of these communication devices may have unique access requirements and a unique telephone number, data message address, or internet address. Contacting a person who has such a variety of communication devices may involve obtaining a list of the telephone numbers, data message addresses, or internet addresses of the communication devices and guessing as to the best way to contact the person and/or trying different devices until the communication is successful performed.

SUMMARY

Various embodiments of the present invention route communications to wireless terminals. A wireless terminal identifier and an alternate routing identifier are associated with a wireless terminal. When an incoming communication is directed to the wireless terminal identifier, it is routed based on the alternate routing identifier when the wireless terminal is not available.

In some further embodiments of the present invention, the alternate routing identifier may be defined at a wireless terminal and communicated as a data message to a wireless network. The data message may be, for example, a short message service data message, an enhanced messaging service data message, and/or an email data message. Alternatively or additionally, the alternate routing identifier may be received from an Internet website that is associated with the wireless network. The wireless network may then associate the alternate routing identifier with the wireless terminal identifier.

In yet some further embodiments of the present invention, the wireless terminal identifier may be a wireless phone number, and an incoming communication that is directed to the wireless phone number may be routed to a voice mailbox that is not associated with the wireless network. For example, the voice mailbox may be part of a public switched telephone network. When the incoming communication is a data message, it may be routed based on an internet address that is associated with the alternate routing identifier, based on a telephone number for a mobile terminal that is associated with the alternate routing identifier, and/or based on a telephone number for a pager that is associated with the alternate routing identifier.

In yet some further embodiments of the present invention, an incoming communication may be converted from one form to another before being routed. For example, an incoming text message may be converted to an audible signal and then routed based on the alternate routing identifier. An incoming voice call may be converted to a text message and/or recorded as a data message and then routed based on the alternate routing identifier.

DETAILED DESCRIPTION

Figures 1, 2:
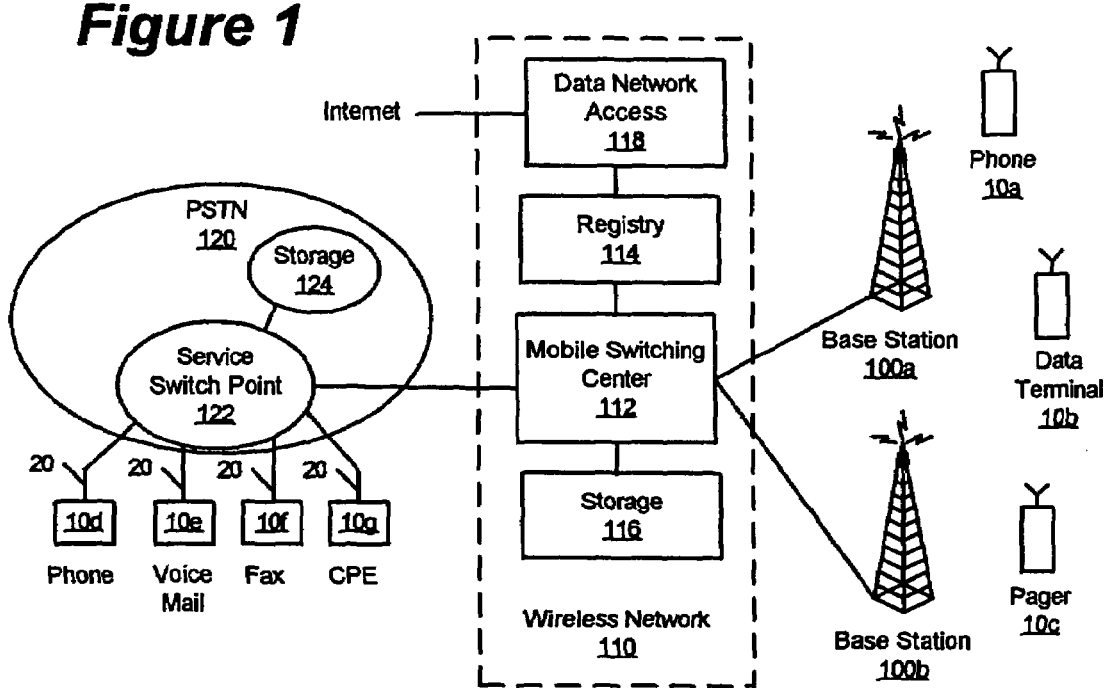
FIG. 1 is a block diagram of a communications system according to various embodiments of the present invention.
FIG. 2 illustrates a data structure of a registry according to various embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions.

The present invention is described below with reference to block diagrams and/or operational illustrations of methods and systems according to embodiments of the invention. It is understood that each block of the block diagrams and/or operational illustrations, and combinations of blocks in the block diagrams and/or operational illustrations, can be implemented by analog and/or digital hardware, and/or computer program instructions. These computer program instructions may be provided to a processor of a general purpose computer, special purpose computer, ASIC, and/or other programmable data processing apparatus in a system, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

It should be understood, that, as used herein, the term "wireless terminal" may include, but is not limited to, a cellular radiotelephone with or without a multi-line display; a pager; a Personal Communications System (PCS) terminal that may combine a cellular radiotelephone with data processing, facsimile and data communications capabilities; a Personal Data Assistant (PDA) that can include a radiotelephone, pager, Internet/intranet access, Web browser, organizer, calendar and/or a global positioning system (GPS) receiver; and a conventional laptop and/or palmtop portable computer that includes a radiotelephone or other transceiver. A wireless terminal may be configured to communicate according one or more wireless communication protocols, including, but not limited to, ANSI-136, Global System for Mobile Communications (GSM), code division multiple access (CDMA), wideband-CDMA, CDMA2000, Enhanced Data rates for GSM Evolution (EDGE), Universal Mobile Telecommunications System (UMTS), a wireless local area network (WLAN) protocol such as IEEE 802.11b-g and Bluetooth, satellite protocols, private land mobile radio protocols such as PROJECT-25 and Tetra, and/or other communication protocols. Communication protocols as used herein may specify the information communicated, the timing, the frequency, the modulation, and/or the operations for setting-up and/or maintaining a communication connection.

FIG. 1 is a block diagram of a communications system for routing communications between communication devices according to various embodiments of the present invention. The communication system includes base stations 100a–b, a wireless network 110, and a Public Switched Telephone Network (PSTN) 120. The base stations 100a–b can communicate over wireless communication channels with wireless terminals, such as, for example, a cellular radiotelephone 10a, a data terminal 10b, and a pager 10c (collectively referred to as "wireless terminals 10a–c"). For purposes of illustration only, it is assumed that the cellular radiotelephone 10a supports at least voice communication, the pager 10c supports at least data communications, and the data terminal 10b supports at least voice and data communications. The wireless network 110 routes communications between the wireless terminals 10a–c, and between the wireless terminals 10a–c and the PSTN 120 and/or the Internet. Although only two base stations 100a–b, one wireless network 110, and three wireless terminals 10a–c are shown, a typical cellular communication system may include hundreds of base stations, many wireless networks, and may serve thousands of wireless terminals.

The PSTN 120 can communicate through subscriber telephone lines 20 with wireline communication devices, such as, for example, a phone 10d, a voice mail device 10e, a facsimile device 10f, and consumer premises equipment (CPE) 10g (collectively referred to as "wireline communication devices 10d–f"). The PSTN 120 routes communications between the wireline communication devices 10d–g, and between the wireline communication devices 10d–g and the wireless network 110. The PSTN 120 includes a service switch point 122 that services the subscriber telephone lines 20 and can include a storage device 124 that is configured to store voice mail and/or text message for retrieval by a user. Although only one service switch point 122 is shown, a typical regional PSTN can include hundreds of service switch points and can serve millions of subscriber telephone lines.

Each of the wireless terminals 10a–c may be assigned a unique wireless terminal identifier, which may be, for example, a unique number and/or a data network address. For example, wireless terminals that support voice communications (e.g., cellular radiotelephone 10a and data terminal 10b) may be assigned unique phone numbers, and wireless terminals that support data communications (e.g., data terminal 10b and pager 10c) may be assigned unique data network addresses. The wireless terminal identifier of GSM type wireless terminals may be based on International Mobile Subscriber Identity (IMSI) numbers that include a Mobile Country Code (MCC), a Mobile Network Code (MNC), and a Mobile Subscriber Identity Number (MSIN).

The wireless network 110 may include a mobile switching center 112, a registry 114, a call storage device 116, and a data network access component 118. The mobile switching center 112 routes communications, such as voice calls and/or data messages, from, to, and/or between one or more of the wireless terminals 10a–c, the PSTN 120, and the Internet via the data network access component 118. Data messages can include email, short message service data messages, and/or enhanced messaging service data messages. The mobile switching center 112 may include separate networks for routing voice communications and data communications. For example, voice communications may be routed through a point-to-point network and data communications may be routed through a packet switched network. The registry 114 contains information that is used by the mobile switching center 112 to route incoming communications, such as voice calls and/or data messages, that are directed to one or more of the wireless terminals 10a–c.

In some embodiments of the present invention, the registry 114 contains the wireless terminal identifiers and associations between each of the wireless terminal identifiers and one or more alternate routing identifiers. The alternate routing identifiers may correspond to, for example, telephone numbers for mobile terminals and/or wireline communication devices that are serviced by the PSTN 120, data message routing identifiers for mobile terminals and/or devices that are accessible via the Internet (e.g., Internet addresses), and/or voice mailboxes and/or data mailboxes that are identified by the alternative routing identifier in the storage device 116 in the wireless network 110 and/or the storage device 124 in the PSTN 120. The registry 114 may also associate other information with the wireless terminal identifiers, such as, for example, service subscription information, information on the present location of a wireless terminal within the communication system, and/or supplemental services information. An exemplary data structure of a registry is shown in FIG. 2.

Figure 3:
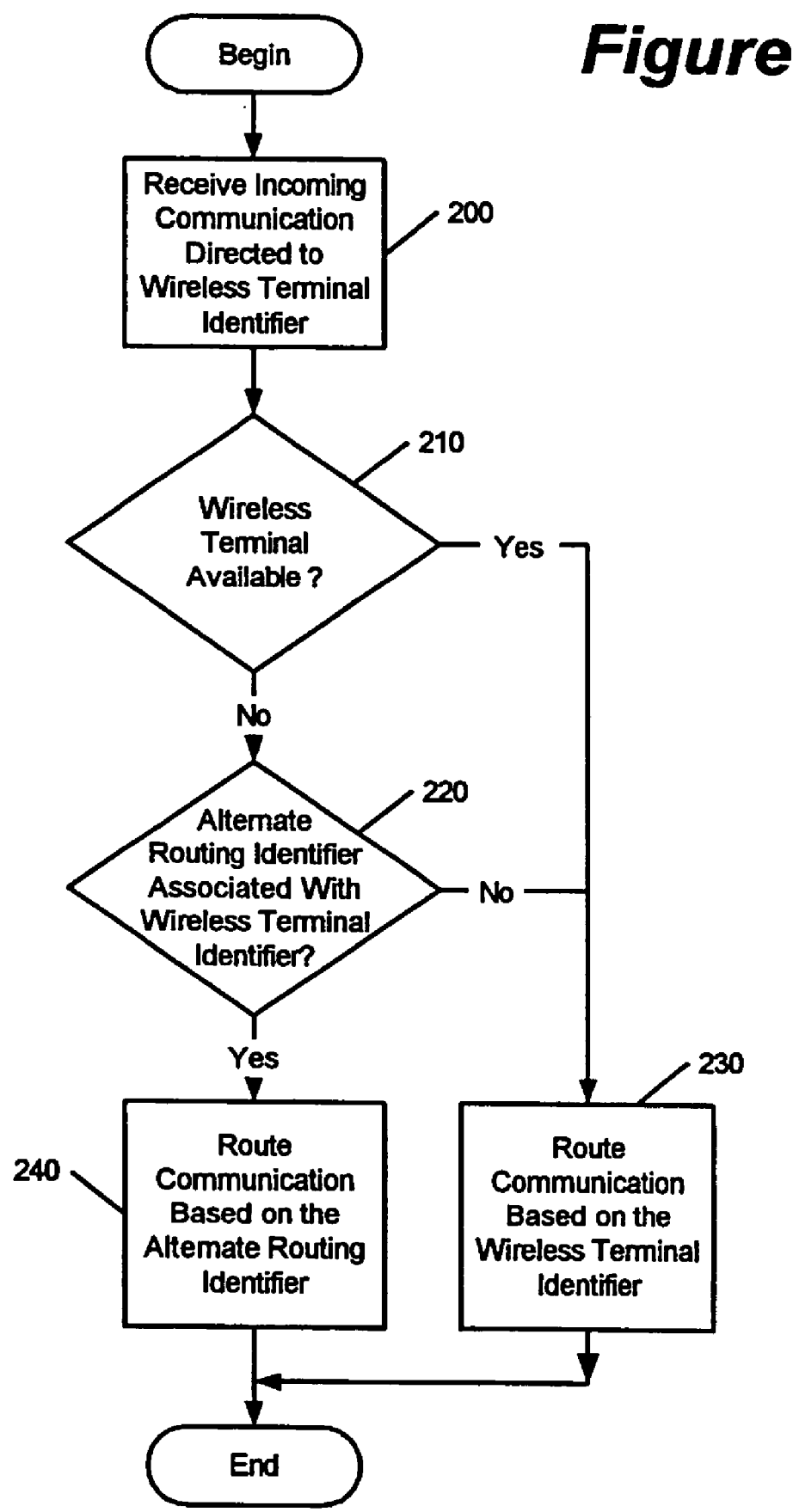
FIG. 3 is a flow chart that illustrates operations for routing incoming communications to wireless terminals according to various embodiments of the present invention.

The mobile switching center 112 accesses the registry 114 to determine how to route incoming communications that are directed to one or more of the wireless terminals 10a–c. FIG. 3 shows operations that may be used by the mobile switching center 112 to route such incoming communications. At Block 200, an incoming communication is received that includes a wireless terminal identifier. The incoming communication may be received from the PSTN 120 according to the Common Channel Signaling System No. 7 (SS7) protocol for call setup, from the Internet as a data message, and/or from the wireless terminals 10a–c. At Block 210, a determination is made as to whether the incoming communication is directed to a wireless terminal that is available. A wireless terminal may not be available because, for example, it has been powered-off, because it is located in a non-serviced area and/or where a communication interface with the wireless terminal has insufficient signal quality to allow communication, because a call to the wireless terminal goes unanswered, and/or because information has been previously communicated to the wireless network 110 that indicates that calls should not be routed to the wireless terminal. The determination on availability of a wireless terminal may be made by, for example, the mobile switching center 112 and/or by one of the base stations 110-b that services an area where the wireless terminal is located. When the wireless terminal is available at Block 210, the incoming communication may be routed to the wireless terminal based on the wireless terminal identifier.

According to various embodiments of the present invention, when the wireless terminal is not available at Block 210, a determination is made at Block 220 as to whether one or more alternative routing identifiers is associated with the wireless terminal identifier of the incoming communication. For example, the mobile switching center 112 may access the registry 114 to identify an alternative routing identifier for an unavailable wireless terminal.

When an alternative routing identifier is not associated with the wireless terminal identifier, then at Block 230 the incoming communication may still be routed based on the wireless terminal identifier to, for example, a voice mailbox in the call-data storage device 116 of a wireless network with which the wireless terminal is registered. In contrast, when an alternative routing identifier is associated with the wireless terminal identifier, then at Block 240 the incoming communication is routed based on the alternative routing identifier. For example, the incoming communication may be routed at Block 240 based on the alternative routing identifier to another wireless terminal, to a wireline communication device that is serviced by the PSTN 120, to a voice mailbox and/or data mailbox in the storage device 116 that is identified by the alternative routing identifier, to a voice mailbox and/or data mailbox in the storage device 124 of the PSTN 120 that is identified by the alternative routing identifier, and/or as a data message that is communicated through the data network access component 118 to the Internet.

When more than one alternate routing identifier is associated with the wireless terminal identifier, an incoming communication may be routed sequentially based the alternate routing identifiers using, for example, defined or default prioritizations of the alternate routing identifiers until the communication is successfully received by a communication device. Alternatively or additionally, an incoming communication may be routed in parallel based on a plurality of the alternate routing identifiers.

Figure 4:
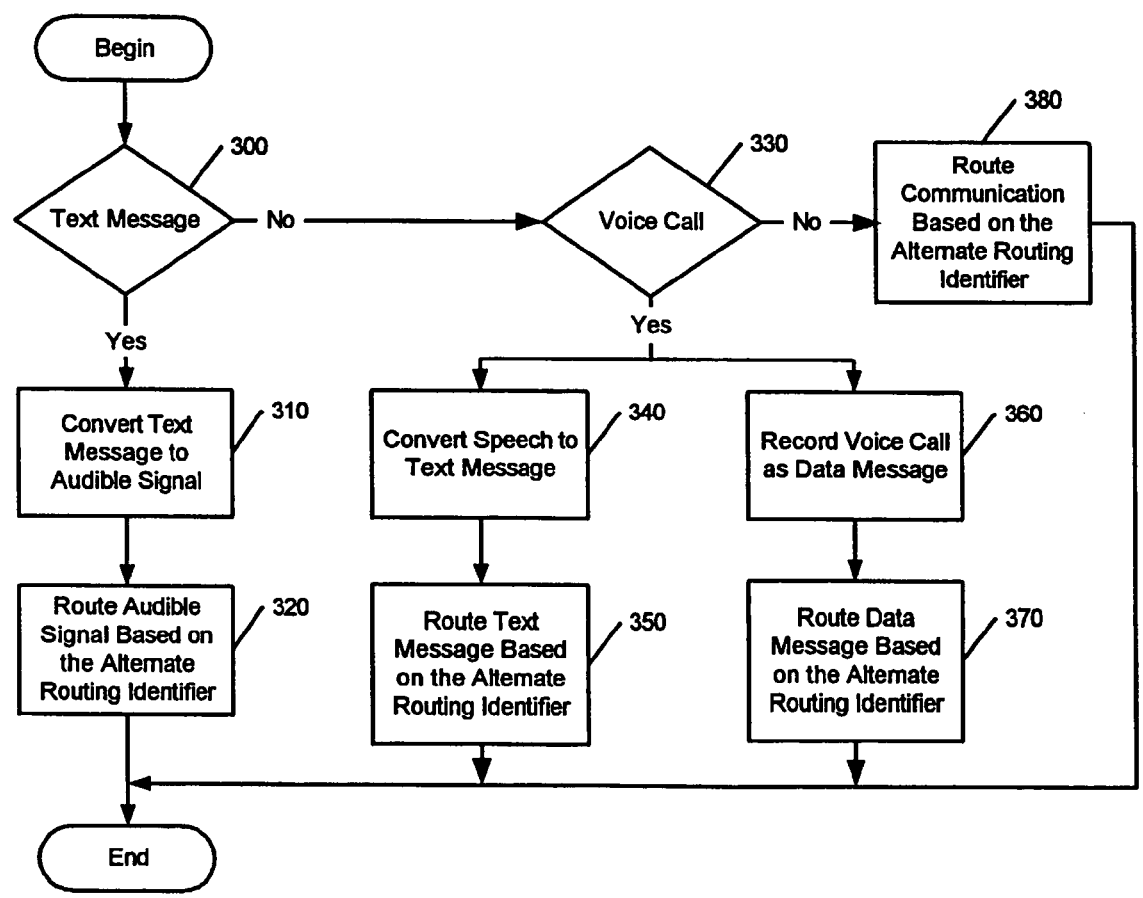
FIG. 4 is a flow chart that illustrates operations for routing incoming communications to wireless terminals according to various embodiments of the present invention.

An incoming communication may be converted at Block 240 from one form to another, such as, for example, from a voice call to a data message that is then routed as a data message, and/or from a text message to an audible signal that is then routed as a voice call. FIG. 4 shows operations that may be used at Block 240 of FIG. 3 to convert and then route communications based on an alternate routing identifier. At Block 300 a decision is made as to whether an incoming communication is a text message. If it is a text message, then at Block 310 the text message is converted to an audible signal using, for example, a conventional text-to-speech program and/or circuitry. The audible signal is then routed at Block 320 as a voice call based on the alternate routing identifier.

When the incoming communication is not a text message at Block 300, then a decision is made at Block 330 as to whether to the incoming communication is a voice call. If it is a voice call, then at Block 340 speech in the voice call may be converted to a text message using, for example, a conventional speech-to-text program and/or circuitry. At Block 350 the text message may then be routed based on the alternate routing identifier. In addition to, or as an alternative to the conversion and routing operations of Blocks 340 and 350, the voice call may be recorded as a data message at Block 360 and routed at Block 370 based on the alternate routing identifier. Thus, if a wireless terminal is not available to receive a voice call, the voice call may be converted to a text message and/or to a data message, and then routed to the wireless terminal and/or to another communication device that is associated with the alternate routing identifier. For example, a wireless terminal that is unavailable for receiving a voice call, but which is available to receive a data message, may receive a voice call as a data message. Similarly, a wireless terminal that is unavailable for receiving a data message, but which is available to receive a voice call, may receive a data message as a voice call. If the incoming communication is not a voice call at Block 330 (e.g., picture message), then at Block 380 the communication may be routed unchanged based on the alternative routing identifier.

The associations between the wireless terminal identifiers and the alternate routing identifiers may be defined by users. For example, a user may define an alternate routing identifier to which incoming communications to a wireless terminal are to be redirected when the wireless terminal is not available. A user may define the alternate routing identifier using, for example, the wireless terminal, a wireline communication device, and/or by logging into a website that is associated with the wireless network 110, such as by access the data network access component 118 via the Internet. A defined alternate routing identifier may be communicated from a wireless terminal to the wireless network 110 as a data message, such as a short message service data message, an enhanced messaging service data message, and/or as an email message. The alternate routing identifier may be communicated with the wireless terminal identifier to the wireless network 110, and/or the wireless network 110 may determine the wireless terminal identifier of the wireless terminal based on information that is received from the wireless terminal (e.g., MSIN of the wireless terminal). Communication of the alternate routing identifier from a wireless terminal identifier to the wireless network 110 may wait until before the wireless terminal turns-off. The associations between the wireless terminal identifiers and the alternate routing identifiers may be additionally or alternatively be defined by an operator of the wireless network 110. For example, an operator may define the associations so that if a wireless terminal is unavailable to receive one form of data message, such as an email message, then the data message is automatically routed as another form of data message, such as a short messaging service data message and/or enhanced messaging service data message.

Figure 5:
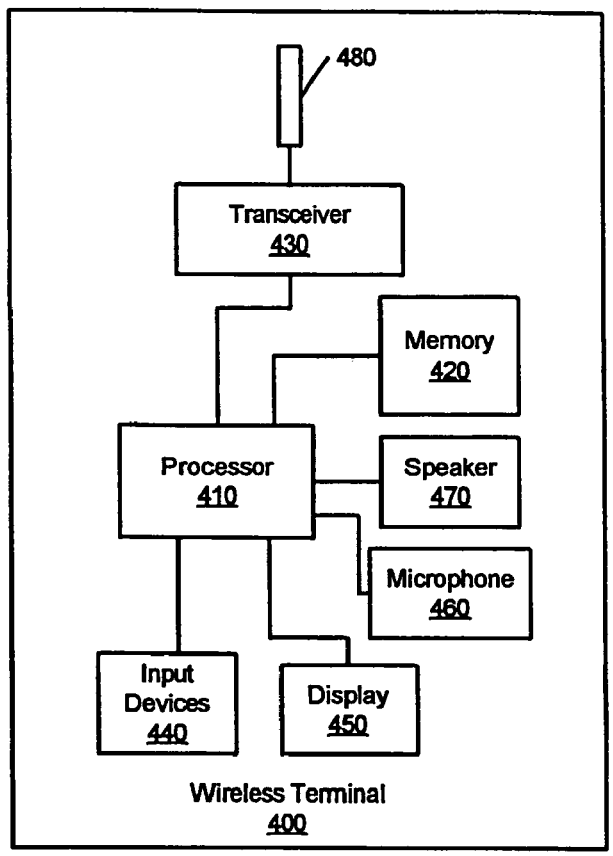
FIG. 5 is a block diagram of a wireless terminal according to various embodiments of the present invention.

FIG. 5 illustrates an exemplary embodiment of a wireless terminal 400 that is suitable for defining and communication an alternate routing identifier according to various embodiments of the present invention. The wireless terminal 400 includes a processor 410, a memory 420, and a transceiver 430, and may further include an input device 440 (e.g., keyboard, keypad), a display 450, a microphone 460, and a speaker 470. The memory 420 may include one or more erasable programmable read-only memories (EPROM or Flash EPROM), battery-backed random access memory (RAM), magnetic, optical, or other digital storage device, and may be separate from, or at least partially within, the processor 410. The transceiver 430 typically includes both a transmitter and a receiver to allow two way communications, but the present invention is not limited to such devices and, as used herein, a "transceiver" may include both a receiver and a transmitter or only one such communication circuit. The wireless terminal 400 may, thereby, communicate with the wireless network 110 using radio frequency signals. The radio frequency signals may be communicated through an antenna 480 over at least one communication channel with the wireless network 110.

Figure 6:
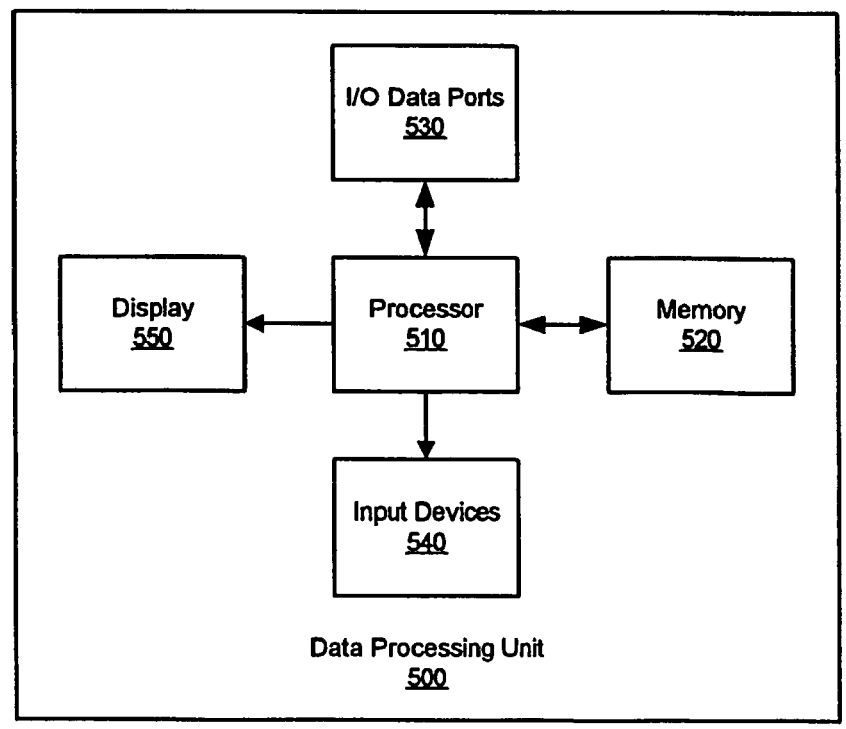
FIG. 6 is a block diagram of a data processing unit according to various embodiments of the present invention.

FIG. 6 illustrates an exemplary embodiment of a data processing unit 500 that is suitable for use as one or more of the components of the wireless network 110. The data processing unit 500 typically includes a processor 510 that communicates with a memory 520 and I/O data ports 530. The memory 520 may be configured to store the data structure of the registry 114 (FIG. 1). The data processing unit 500 may also include input device(s) 540 such as a keyboard or keypad, and a display 550 that also communicate with the processor 510. The I/O data ports 530 can be used to transfer information between the data processing unit 500 and another component of the wireless network 110, the base stations 100a–b, and/or the PSTN 120. These components may be conventional components such as those used in many conventional wireless networks and/or mobile switching centers which are configured to operate as described herein.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of routing incoming communications to a wireless terminal, the method comprising:
    associating a wireless terminal identifier and an alternate routing identifier with a wireless terminal;
    determining whether an alternate routing rule has been satisfied; and
    routing an incoming communication, which is directed to the wireless terminal identifier, based on the wireless terminal identifier when the alternate routing rule has not been satisfied or based on the alternate routing identifier when the alternate routing rule has been satisfied, wherein determining whether an alternate routing rule has been satisfied comprises determining whether a threshold amount of memory is available in the wireless terminal that is associated with the wireless terminal identifier.

2. The method of claim 1, wherein determining whether an alternate routing rule has been satisfied comprises determining the availability on a network of the wireless terminal that is associated with the wireless terminal identifier.

3. The method of claim 1, wherein determining whether an alternate routing rule has been satisfied comprises determining whether the wireless terminal that is associated with the wireless terminal identifier is a predefined type of wireless terminal.

4. The method of claim 1, wherein determining whether an alternate routing rule has been satisfied comprises determining whether a predefined service is available for the wireless terminal that is associated with the wireless terminal identifier.

5. The method of claim 1, wherein determining whether an alternate routing rule has been satisfied comprises determining whether the incoming communication is a predefined type of communication.

6. The method of claim 1, wherein determining whether an alternate routing rule has been satisfied is based on at least one of time and day.

7. The method of claim 1, wherein determining whether an alternate routing rule has been satisfied is based on whether a predefined routing identifier has been received from a user.

8. The method of claim 1, wherein associating a wireless terminal identifier and an alternate routing identifier with a wireless terminal comprises:
    defining the alternate routing identifier at the wireless terminal; and
    communicating the alternate routing identifier from the wireless terminal to a wireless network.

9. The method of claim 8, wherein communicating the alternate routing identifier from the wireless terminal to the wireless network comprises communicating the alternate routing identifier as a data message from the wireless terminal to the wireless network.

10. The method of claim 1, wherein associating a wireless terminal identifier and an alternate routing identifier with a wireless terminal comprises:
    defining at the wireless terminal an alternate phone number to which a call to the wireless terminal is to be redirected;
    communicating the phone number as the alternate routing identifier from the wireless terminal to a wireless network; and
    associating the alternate phone number with the wireless terminal identifier at the wireless network.

11. The method of claim 1, wherein:
    determining whether an alternate routing rule has been satisfied comprises determining that the incoming communication comprises a data message; and
    routing an incoming communication comprises routing the data message based on at least one of an internet address that is associated with the alternate routing identifier, a telephone number for a mobile terminal that is associated with the alternate routing identifier, and a telephone number for a pager that is associated with the alternate routing identifier.

12. A method of routing incoming communications to a wireless terminal, the method comprising:
    associating a wireless terminal identifier and an alternate routing identifier with a wireless terminal;
    determining whether an alternate routing rule has been satisfied; and
    routing an incoming communication, which is directed to the wireless terminal identifier, based on the wireless terminal identifier when the alternate routing rule has not been satisfied or based on the alternate routing identifier when the alternate routing rule has been satisfied, wherein:
    determining whether an alternate routing rule has been satisfied comprises determining that the incoming communication comprises a text message; and
    routing an incoming communication comprises converting the text message to an audible signal, and routing the audible signal based on the alternate routing identifier.

13. A wireless network that routes incoming communications to a wireless terminal, the wireless network comprising:
    a registry that is configured to associate a wireless terminal identifier and an alternate routing identifier with a wireless terminal; and
    a mobile switching center that is configured to determine whether an alternate routing rule has been satisfied, and is configured to route an incoming communication, which is directed to the wireless terminal identifier, based on the wireless terminal identifier when the alternate routing rule has not been satisfied or based on the alternate routing identifier when the alternate routing rule has been satisfied, wherein the mobile switching center is configured to determine whether an alternate routing rule has been satisfied by determining whether a threshold amount of memory is available in the wireless terminal that is associated with the wireless terminal identifier.

14. The wireless network of claim 13, wherein the mobile switching center is configured to determine whether an alternate routing rule has been satisfied by determining the availability on a network of the wireless terminal that is associated with the wireless terminal identifier.

15. The wireless network of claim 13, wherein the mobile switching center is configured to determine whether an alternate routing rule has been satisfied by determining whether the wireless terminal that is associated with the wireless terminal identifier is a predefined type of wireless terminal.

16. The wireless network of claim 13, wherein:
the registry is configured to associate a wireless terminal identifier with an alternative data routing identifier and an alternative voice routing identifier; and
the mobile switching center is configured to route the incoming communication based on the data routing identifier when the incoming communication comprises a data message, and is configured to routing the incoming communication based on the voice routing identifier when the incoming communication comprises a voice call.

17. A wireless network that routes incoming communications to a wireless terminal, the wireless network comprising:
a registry that is configured to associate a wireless terminal identifier and an alternate routing identifier with a wireless terminal; and
a mobile switching center that is configured to determine whether an alternate routing rule has been satisfied, and is configured to route an incoming communication, which is directed to the wireless terminal identifier, based on the wireless terminal identifier when the alternate routing rule has not been satisfied or based on the alternate routing identifier when the alternate routing rule has-been satisfied, wherein the mobile switching center is configured to convert an incoming text message to an audible signal and to route the audible signal based on the alternate routing identifier when the wireless terminal is not available.

18. The wireless network of claim 17, wherein the mobile switching center is configured to determine whether an alternate routing rule has been satisfied by determining whether a predefined service is available for the wireless terminal that is associated with the wireless terminal identifier.

19. The wireless network of claim 17, wherein the mobile switching center is configured to determine whether an alternate routing rule has been satisfied by determining whether the incoming communication is a predefined type of communication.

20. The wireless network of claim 17, wherein the mobile switching center is configured to route the incoming communication based on the wireless terminal identifier or the alternate routing identifier based on at least one of time and day.

21. The wireless network of claim 17, wherein the mobile switching center is configured to route the incoming communication based on the wireless terminal identifier or the alternate routing identifier based on whether a predefined routing identifier has been received from a user.

22. The wireless network of claim 17, wherein the registry is configured to associate a plurality of alternate routing identifiers with the wireless terminal identifier.

23. The wireless network of claim 17, wherein the mobile switching center is configured to sequentially determine the availability of communication devices associated with the plurality of alternate routing identifiers when the alternate routing rule has been satisfied, and to route the incoming communication based on the determination of the availability of the communication devices.

24. The wireless network of claim 17, wherein the mobile switching center is configured to simultaneously route the incoming communication to at least some of the plurality of alternate routing identifiers when the alternate routing rule has been satisfied.

25. A wireless network that routes incoming communications to a wireless terminal, the wireless network comprising:
a registry that is configured to associate a wireless terminal identifier and an alternate routing identifier with a wireless terminal; and
a mobile switching center that is configured to determine whether an alternate routing rule has been satisfied, and is configured to route an incoming communication, which is directed to the wireless terminal identifier, based on the wireless terminal identifier when the alternate routing rule has not been satisfied or based on the alternate routing identifier when the alternate routing rule has been satisfied, wherein the mobile switching center is configured to convert an incoming voice call to a text message and to route the text message based on the alternate routing identifier when the wireless terminal is not available.

26. A wireless network that routes incoming communications to a wireless terminal, the wireless network comprising:
a registry that is configured to associate a wireless terminal identifier and an alternate routing identifier with a wireless terminal; and
a mobile switching center that is configured to determine whether an alternate routing rule has been satisfied, and is configured to route an incoming communication, which is directed to the wireless terminal identifier, based on the wireless terminal identifier when the alternate routing rule has not been satisfied or based on the alternate routing identifier when the alternate routing rule has been satisfied, wherein the mobile switching center is configured to record an incoming voice call as a data message when the wireless terminal is not available, and is configured to route the data message based on the alternate routing identifier.

27. A computer program product for routing incoming communications to a wireless terminal, the computer program product comprising program code embodied in a computer-readable storage medium, the computer program code comprising:
program code that is configured to associate a wireless terminal identifier with an alternate routing identifier;
program code that is configured to determine whether an alternate routing rule has been satisfied; and
program code that is configured to route an incoming communication, which is directed to the wireless terminal identifier, based on the wireless terminal identifier when the alternate routing rule has not been satisfied or based on the alternate routing identifier when the alternate routing rule has been satisfied, wherein the program code that is configured to determine whether an alternate routing rule has been satisfied is further configured to make the determination of whether the alternative routing rule has been satisfied based on whether a threshold amount of memory is available in the wireless terminal that is associated with the wireless terminal identifier.

* * * * *